(No Model.)
C. H. PALMER, Jr.
CARRIAGE AXLE.
No. 457,367. Patented Aug. 11, 1891.
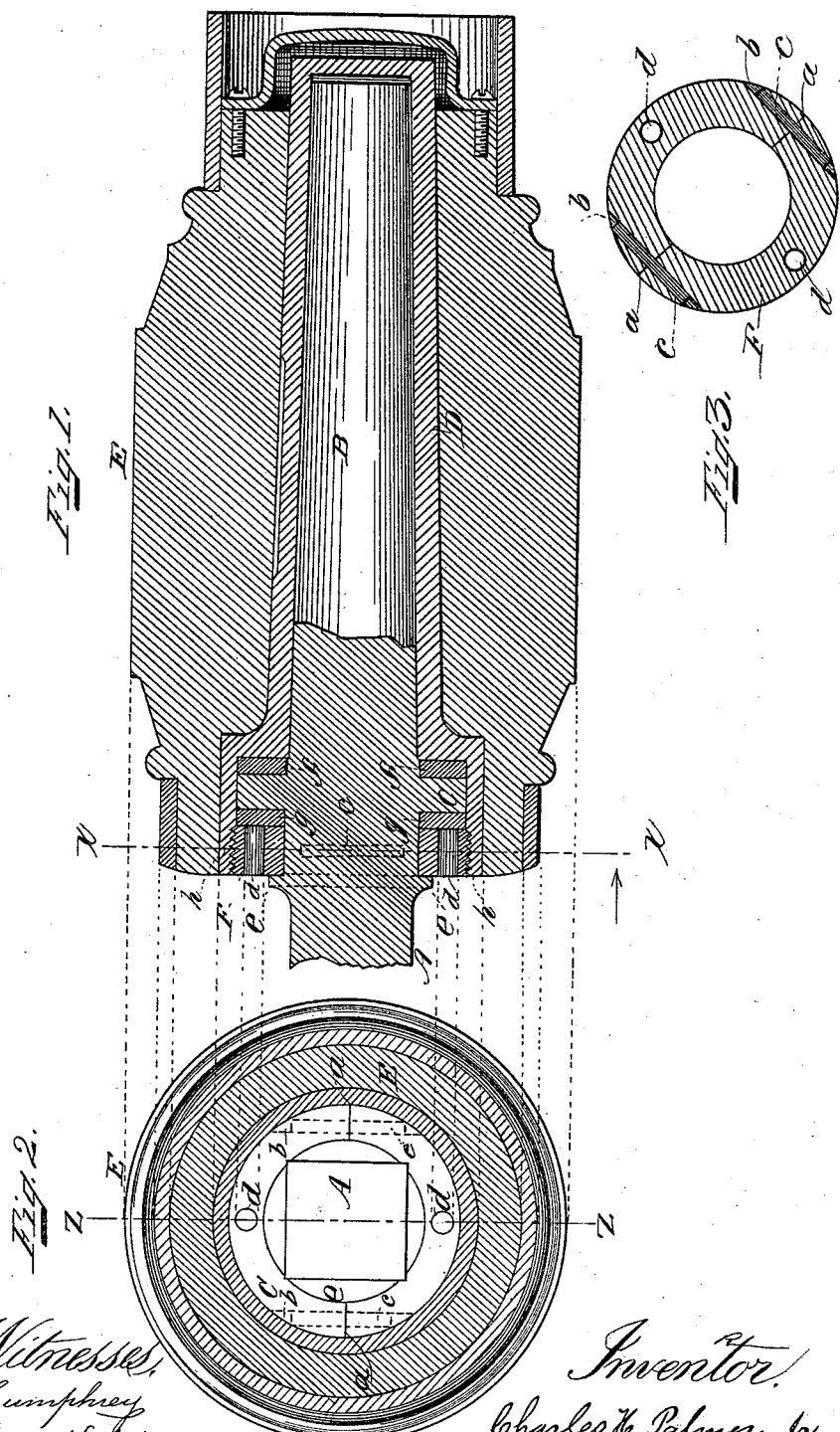

UNITED STATES PATENT OFFICE.

CHARLES H. PALMER, JR., OF AMESBURY, MASSACHUSETTS.

CARRIAGE-AXLE.

SPECIFICATION forming part of Letters Patent No. 457,367, dated August 11, 1891.

Application filed January 24, 1891. Serial No. 378,888. (No model.)

*To all whom it may concern:*

Be it known that I, CHARLES H. PALMER, Jr., of Amesbury, in the county of Essex and State of Massachusetts, have invented a new and useful Improvement in Carriage-Axles, which will, in connection with the accompanying drawings, be hereinafter fully described, and specifically defined in the appended claim.

In said drawings, Figure 1 is a longitudinal section through an axle arm and box having my invention thereto applied, the hub, bands, and cap being also shown in section, the section being taken as on line Z, Fig. 2. Fig. 2 is an end elevation, partly in section, viewed as from the inner end of the hub. Fig. 3 is a detached section through the securing-collar and taken as on line X, Fig. 1.

The object of my invention is to provide an improved device by which to secure the wheel upon the axle, and it will, in connection with the accompanying drawings, be hereinafter described and claimed.

Referring again to said drawings, A represents the bed of the axle (that portion that extends from hub to hub across the vehicle.)

B is the axle-arm.

C is the solid collar, and D the box, which is secured in the hub E. Said collar C of the axle fits in the bore of the chambered portion $h$ of the box, in the bottom of which chamber is preferably placed the usual washer $f$, as shown, to serve as the inner bearing of said collar.

To secure the box upon the axle, I form the latter cylindrical upon the inner side of the collar—that is, on the side next bed A; and I secure thereon the "running" collar F, which is formed in two parts or halves, which abut together at line $a\ a$ and are held together by the pins $c$, inserted in holes $b$, as shown in Fig. 3. The peripheral face of this collar is screw-threaded, as is also the inner wall of chamber $h$ adjacent to the end of the box and so as to coincide with and receive the thread on the collar. Upon the axle and inside the cylindrical portion that receives collar F, I preferably form a shallow collar $e$, which prevents collar F from moving inward when disconnected from the box. I preferably arrange a leather or other suitable washer $g$ between collars C and F, which, together with washers $f$, serves to muffle the sound and reduce friction. By forming collar F in two parts I am enabled to employ it upon axles having the two solid collars C and $e$; and, besides, I can employ "blind-boxes" D, (closed at the outer end,) with "fan-tailed" axles, (those having their beds gradually widened from the hub to the lineal center thereof,) over which collars of a size to fit the axle at the hub could not be passed, as the two halves of my collar can be placed in position upon the axles and then secured together by inserting pins $c$ in the holes $b$. To disengage collar F from or engage it with box D, the forks of a suitable spanner are engaged in holes $d$ in the collar for that purpose.

I am aware that blind-boxes are old, and that it is not new to employ a collar threaded to the box to hold the wheel upon the axle; but I am, as I believe, the first to employ a divided collar for such purpose and the first to employ a running collar arranged between two solid collars for such purpose. Hence I claim as my invention—

In combination with the chambered box, the axle having a solid collar fitting in said chamber and the running collar arranged upon the axle, the inner or second collar $e$ to serve as an abutment for said running collar, substantially as specified.

CHARLES H. PALMER, JR.

Witnesses:
GEORGE H. BRIGGS,
DELL W. DOLBIER.